(12) United States Patent
Inoue et al.

(10) Patent No.: US 8,320,899 B2
(45) Date of Patent: Nov. 27, 2012

(54) INSTALLATION NOTIFICATION METHOD, INSTALLATION NOTIFICATION SYSTEM, AND INSTALLATION NOTIFICATION SERVER

(75) Inventors: Akihiro Inoue, Ichikawa (JP); Hyunsuk Seung, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 186 days.

(21) Appl. No.: 12/690,376

(22) Filed: Jan. 20, 2010

(65) Prior Publication Data

US 2010/0190482 A1 Jul. 29, 2010

(30) Foreign Application Priority Data

Jan. 26, 2009 (JP) .............................. P2009-014598

(51) Int. Cl.
*H04M 3/00* (2006.01)
(52) U.S. Cl. ........................................ 455/419; 455/418
(58) Field of Classification Search ............ 455/418–420
See application file for complete search history.

(56) References Cited

U.S. PATENT DOCUMENTS

| 2003/0009754 | A1 | 1/2003 | Rowley et al. | |
|---|---|---|---|---|
| 2003/0022657 | A1* | 1/2003 | Herschberg et al. | 455/414 |
| 2005/0055687 | A1 | 3/2005 | Mayer | |
| 2005/0059393 | A1* | 3/2005 | Knowles | 455/432.3 |
| 2005/0079863 | A1* | 4/2005 | Macaluso | 455/419 |
| 2006/0047942 | A1 | 3/2006 | Rothman et al. | |
| 2006/0073820 | A1* | 4/2006 | Craswell et al. | 455/419 |
| 2006/0212548 | A1 | 9/2006 | Faisal et al. | |
| 2008/0141240 | A1 | 6/2008 | Uthe | |

FOREIGN PATENT DOCUMENTS

| JP | 5-3581 | 1/1993 |
|---|---|---|
| JP | 2002-7129 | 1/2002 |
| JP | 2002-189601 | 7/2002 |
| JP | 2004-126856 | 4/2004 |
| JP | 2007-226740 | 9/2007 |
| JP | 2007-323653 | 12/2007 |
| WO | WO 00/36503 A2 | 6/2000 |
| WO | WO 00/36503 A3 | 6/2000 |

OTHER PUBLICATIONS

Chinese Office Action issued May 16, 2012 in counterpart Chinese patent application No. 201010105270.0.
Japanese Office Action issued Sep. 25, 2012 in Japanese Patent Application No. P2009-014598, filed Jan. 26, 2009 (with English translation).

(Continued)

*Primary Examiner* — Steven Lim
(74) *Attorney, Agent, or Firm* — Oblon, Spivak, McClelland, Maier & Neustadt, L.L.P.

(57) ABSTRACT

A mobile terminal is notified of information indicating that an operator pack or the like is downloadable, without need for a user of the mobile terminal to perform any active operation and without need for the mobile terminal to be preliminarily equipped with an extra function for automatic installation. An installation notification system 10 of the present invention includes a mobile terminal 50 and an installation notification server 60 and is provided with an operator pack presence determining unit 15 configured to determine whether an operator pack is present in the mobile terminal 50, based on originating data sent from the mobile terminal 50, and an installation notifying unit 18 configured to notify the mobile terminal 50 of installable information indicating that the operator pack is installable, when the operator pack presence determining unit 15 determines that the operator pack is absent.

5 Claims, 8 Drawing Sheets

OTHER PUBLICATIONS

"DoCoMo to Develop Operator Pack for FOMA Handsets", Press Releases, online, URL:http://www.nttdocomo.co.jp/info/news_release/page/080421_00.html, Apr. 21, 2008.

Chinese Office Action issued Sep. 13, 2012 in counterpart Chinese Patent Application No. 201010105270.0 (with English translation).

* cited by examiner

| Type of application in operator pack | ID data of application in operator pack (User-Agent value) |
|---|---|
| browser | d-aaa/1.0 |
| mailer | d-bbb/1.0 |
| SIP (PoC) | dP-ccc/2.0 |
| etc | ... |

*Fig.3*

| Type of application used for determining whether operator pack is already installed | Communication data | Already installed | Already notified of installable information | Notification method of installable information | Notification destination of installable information |
|---|---|---|---|---|---|
| Mobile phone serial number (e.g. IMEI, ESN, etc) | SSBBBBBBCC | No | No | SMS | 0X0-000-0000 |
| Browser User-Agent | s-aaa/1.0 | No | No | HTTP | http://www.aaaa... |
| Email User-Agent | s-bbb/1.0 | No | Yes | Email | userXXX@aaaa.ne.jp |
| SIP (PoC) User-Agent | sP-ccc/2.0 | No | No | SMS | 0X0-000-0000 |
| etc | ... | ... | ... | ... | ... |

| Type of application used for determining whether operator pack is already installed | Communication data | Already installed | Already notified of installable information | Notification method of installable information | Notification destination of installable information |
|---|---|---|---|---|---|
| Mobile phone serial number (e.g. IMEI, ESN, etc) | SSBBBBBBCC | No | No | SMS | 0X0-000-0000 |
| Browser User-Agent | s-aaa/1.0 | No | No | HTTP | http://www.aaaa··· |
| Email User-Agent | d-bbb/1.0 | Yes | Yes | Email | userXXX@aaaa.ne.jp |
| SIP (PoC) User-Agent | sP-ccc/2.0 | No | No | SMS | 0X0-000-0000 |

*Fig.7*

| Type of application used for determining whether operator pack is already installed | Communication data | Already installed | Already notified of installable information | Notification method of installable information | Notification destination of installable information |
|---|---|---|---|---|---|
| Mobile phone serial number (e.g. IMEI, ESN, etc) | DDBBBBBBCC | No | No | SMS | 0X0-000-0000 |
| Browser User-Agent | d-aaa/1.0 | Yes | Yes | HTTP | http://www.aaaa・・・ |
| Email User-Agent | d-bbb/1.0 | Yes | Yes | Email | userXXX@aaaa.ne.jp |
| SIP (PoC) User-Agent | dP-ccc/2.0 | Yes | Yes | SMS | 0X0-000-0000 |

Fig.8

| Type of application used for determining whether operator pack is already installed | Communication data | Already installed | Already notified of installable information | Notification method of installable information | Notification destination of installable information |
|---|---|---|---|---|---|
| Mobile phone serial number (e.g. IMEI, ESN, etc) | DDBBBBBBCC | Yes | No | SMS | 0X0-000-0000 |
| Browser User-Agent | d-aaa/1.0 | Yes | Yes | HTTP | http://www.aaaa... |
| Email User-Agent | d-bbb/1.0 | Yes | Yes | Email | userXXX@aaaa.ne.jp |
| SIP (PoC) User-Agent | dP-ccc/2.0 | Yes | Yes | SMS | 0X0-000-0000 |

INSTALLATION NOTIFICATION METHOD, INSTALLATION NOTIFICATION SYSTEM, AND INSTALLATION NOTIFICATION SERVER

BACKGROUND OF THE INVENTION

1. Field of the Invention

The present invention relates to an installation notification method, installation notification system, and installation notification server.

2. Related Background Art

An operator specific software pack (which is generally called "operator pack" and which will also be referred to hereinafter as "operator pack" herein) allows a user of a mobile terminal to optimally utilize various services provided by a telecommunications carrier, and is provided together with the mobile terminal. Therefore, the operator pack has been provided heretofore to the user (by a telecommunications carrier corresponding to the operator pack) in a state in which it was preliminarily loaded on the mobile terminal at the factory.

However, the factory-loaded operator pack is not feasible in the following cases: (1) the mobile terminal is used in networks of two or more telecommunications carriers; (2) the mobile terminal is used in a country other than the one it was intended for or sold at (e.g. used in an international roaming service mode); (3) the mobile terminal is connected via a wireless LAN to a network; and (4) a mobile terminal manufacturer sells the mobile terminal (instead of through a telecommunications carrier or carriers). In these cases, the user needs to install a suitable operator pack after purchase, in order to use services provided by the telecommunications carrier or carriers, in an optimum environment.

Specifically, in the case (1) where one mobile terminal is used in networks of two or more telecommunications carriers (e.g., when the telecommunications carriers to be used are changed over from one to the other without change of the mobile terminal), only the operator pack of the telecommunications carrier before the changeover is installed on the mobile terminal and therefore the mobile terminal is not ready for optimum utilization of various services provided by the telecommunications carrier after the changeover. In the case (2) where the mobile terminal is used in a country other than the one it was intended for or sold at, the operator pack installed thereon is the one of the telecommunications carrier in the home country and it is conceivable that the mobile terminal is not ready for optimum utilization of various services provided by a roaming telecommunications carrier. In the case (3) where the mobile terminal is connected via a wireless LAN to a network, a suitable operator pack also needs to be installed on the mobile terminal whereby the mobile terminal becomes ready for optimum utilization of various services provided by a telecommunications carrier corresponding to the operator pack. Furthermore, in the case (4) where the mobile terminal manufacturer directly sells the mobile terminal, it is presumable that only essential basic functions are provided and that an optimum operator pack for utilization of various services provided by a telecommunications carrier is not installed on the mobile terminal, and it is thus conceivable that the mobile terminal is not ready for optimum utilization of the services provided by the telecommunications carrier. Therefore, in the above-described cases (1) to (4), the user needs to install an appropriate operator pack on the mobile terminal.

The "optimum services" herein refer to services independently provided by each telecommunications carrier, e.g., so-called character patterns which can be used in creation of e-mail messages.

Patent Document 1 below discloses the technology for automatically installing various drivers and software programs onto an external terminal. Patent Document 1 concerns a software management system capable of increasing work efficiency by saving the manufacturer's trouble and the user's trouble of newly installing various drivers and software applications onto a personal computer and capable of reducing the user's load of software management work. Specifically, it discloses the technology for letting the user connect the personal computer to a server, selecting optimum software for the product, based on personal information, e-mail address, and product information sent from the user's personal computer, and downloading and installing the software onto the computer.

Patent Document 1: Japanese Patent Application Laid-open No. H05-3581

SUMMARY OF THE INVENTION

In the system described in Patent Document 1, however, an automatic installation program needs to be preliminarily installed on the installing terminal. Furthermore, the user of the terminal needs to actively send the information such as the e-mail address and model name to the server.

In this respect, when the operator pack is first installed onto the terminal in situations like the above-described cases (1) to (4), it is difficult for the mobile terminal to be preliminarily equipped with an extra function for download and installation of the operator pack. Furthermore, it is often the case that the user of the mobile terminal does not recognize the existence of the operator pack itself, and it is generally unconceivable that the user of the mobile terminal actively accesses the server of the telecommunications carrier without being notified by the telecommunications carrier that the operator pack is installable.

Therefore, in the case of the system requiring the preliminary installation of the automatic installation program and requiring the active transmission of the information such as the e-mail address and model name to the server like the system described in Patent Document 1, there was the problem that the appropriate operator pack could not be installed onto the mobile terminal, e.g., in the situations like the above-described cases (1) to (4) where it was difficult to preliminarily load the mobile terminal with the installation program and where it was generally unconceivable that the user of the mobile terminal actively accessed the server of the telecommunications carrier.

It is therefore an object of the present invention to provide an installation notification method, installation notification system, and installation notification server capable of notifying the user of the mobile terminal of the information indicating that the operator pack or the like is downloadable, without need for the user of the mobile terminal to perform any active operation and without need for the mobile terminal to be preliminarily equipped with an extra function for automatic installation.

In order to solve the above problem, an installation notification method according to the present invention is an installation notification method comprising: an application presence determining step of, based on originating data sent from a terminal, determining whether a particular application in an operator pack is present in the terminal; and an installation notifying step of, when it is determined in the application presence determining step that the application is absent, notifying the terminal of installable information indicating that the application is installable.

In this configuration, the application presence determining step is to determine whether the particular application in the operator pack is present in the terminal, based on the originating data sent from the terminal, and the installation notifying step is to notify the terminal of the installable information indicating that the application is installable, when it is determined in the application presence determining step that the application is absent; therefore, without need for the terminal to be equipped with an extra function and without need for the user of the terminal to perform any extra work, it can be recognized that the application is absent in the terminal, and the terminal can be notified of the information indicating that the application is installable.

In the installation notification method of the present invention, preferably, the installation notifying step comprises notifying the terminal of installable information indicating that the operator pack is installable, when it is determined in the application presence determining step that the particular application is absent.

In this configuration, the installation notifying step is to notify the terminal of the installable information indicating that the operator pack is installable, when it is determined in the application presence determining step that the particular application is absent, whereby the terminal can be notified of the installable information indicating that the operator pack is installable, when the application is determined to be absent.

In the installation notification method of the present invention, preferably, the application presence determining step comprises determining a type of an application present in the terminal, based on the originating data, and determining that the particular application is present, when the type of the application determined is the same as a type of the application in the operator pack.

In this configuration, the application presence determining step is to determine the type of the application present in the terminal, based on the originating data, and determine that the particular application is present, when the type of the application determined is the same as the type of the application in the operator pack, whereby the presence of the particular application can be determined easier.

Preferably, the installation notification method of the present invention further comprises a management information registering step of retaining information of notification in operator pack management information retaining unit when the installation notifying step results in notifying the terminal of the installable information; and a already-notified determining step of determining whether the terminal was already notified of the installable information, based on information retained in the operator pack management information retaining unit, and the installation notifying step comprises not notifying the terminal of the installable information when it is determined in the already-notified determining step that the terminal was already notified of the installable information.

In this configuration, the management information registering step is to retain the information of the notification in the operator pack management information retaining unit when the terminal is notified of the installable information, the already-notified determining step is to determine whether the terminal was already notified of the installable information, based on the information retained in the operator pack management information retaining unit, and the installation notifying step is not to notify the terminal of the installable information when it is determined in the already-notified determining step that the terminal was already notified of the installable information, whereby the same notification can be prevented from being sent two or more times.

In order to solve the above problem, an installation notification system according to the present invention is an installation notification system comprising a terminal and a server, the installation notification system comprising: application presence determining unit configured to, based on originating data sent from the terminal, determining whether a particular application in an operator pack is present in the terminal; and installation notifying unit configured to, when the application presence determining unit determines that the application is absent, notify the terminal of installable information indicating that the application is installable.

In this configuration, the application presence determining unit determines whether the particular application in the operator pack is present in the terminal, based on the originating data sent from the terminal, and the installation notifying unit notifies the terminal of the installable information indicating that the application is installable, when the application presence determining unit determines that the application is absent; therefore, without need for the terminal to be equipped with an extra function and without need for the user of the terminal to perform any extra work, the server can recognize that the application is absent in the terminal and notify the terminal of the information indicating that the application is installable.

In order to solve the above problem, an installation notification server according to the present invention is an installation notification server comprising: application presence determining unit configured to, based on received data from an originator terminal, determine whether a particular application in an operator pack is present in the originator terminal having sent the received data; and installation notifying unit configured to, when the application presence determining unit determines that the application is absent, notify the originator terminal of installable information indicating that the application is installable.

In this configuration, the application presence determining unit determines whether the particular application in the operator pack is present in the originator terminal having sent the received data, based on the received data from the originator terminal, and the installation notifying unit notifies the originator terminal of the installable information indicating that the application is installable, when the application presence determining unit determines that the application is absent; therefore, without need for the originator terminal to be equipped with an extra function and without need for the user of the originator terminal to perform any extra work, the server can recognize that the application is absent in the originator terminal and notify the terminal of the information indicating that the application is installable.

The installation notification method, installation notification system, and installation notification server according to the present invention are able to notify the user of the mobile terminal of the information indicating that the operator pack or the like is downloadable, without need for the user of the terminal to perform any active operation and without need for the terminal to be preliminarily equipped with an extra function for automatic installation.

DESCRIPTION OF THE PREFERRED EMBODIMENTS

Embodiments of the present invention will be described with reference to the accompanying drawings. The same portions will be denoted by the same reference symbols as much as possible, without redundant description.

First Embodiment

An installation notification system 10 according to the first embodiment of the present invention will be described with reference to the drawings. The present embodiment will describe a form of installing an operator pack rather than a single application.

In the present specification, an "operator pack" refers to a combination of various "applications" contributing to enabling a user of a mobile terminal to optimally utilize various services provided by a telecommunications carrier.

An "application" refers specifically to a browser or mailer and, concerning the "applications," different applications are used among telecommunications carriers in accordance with services provided thereby.

Figure 1:
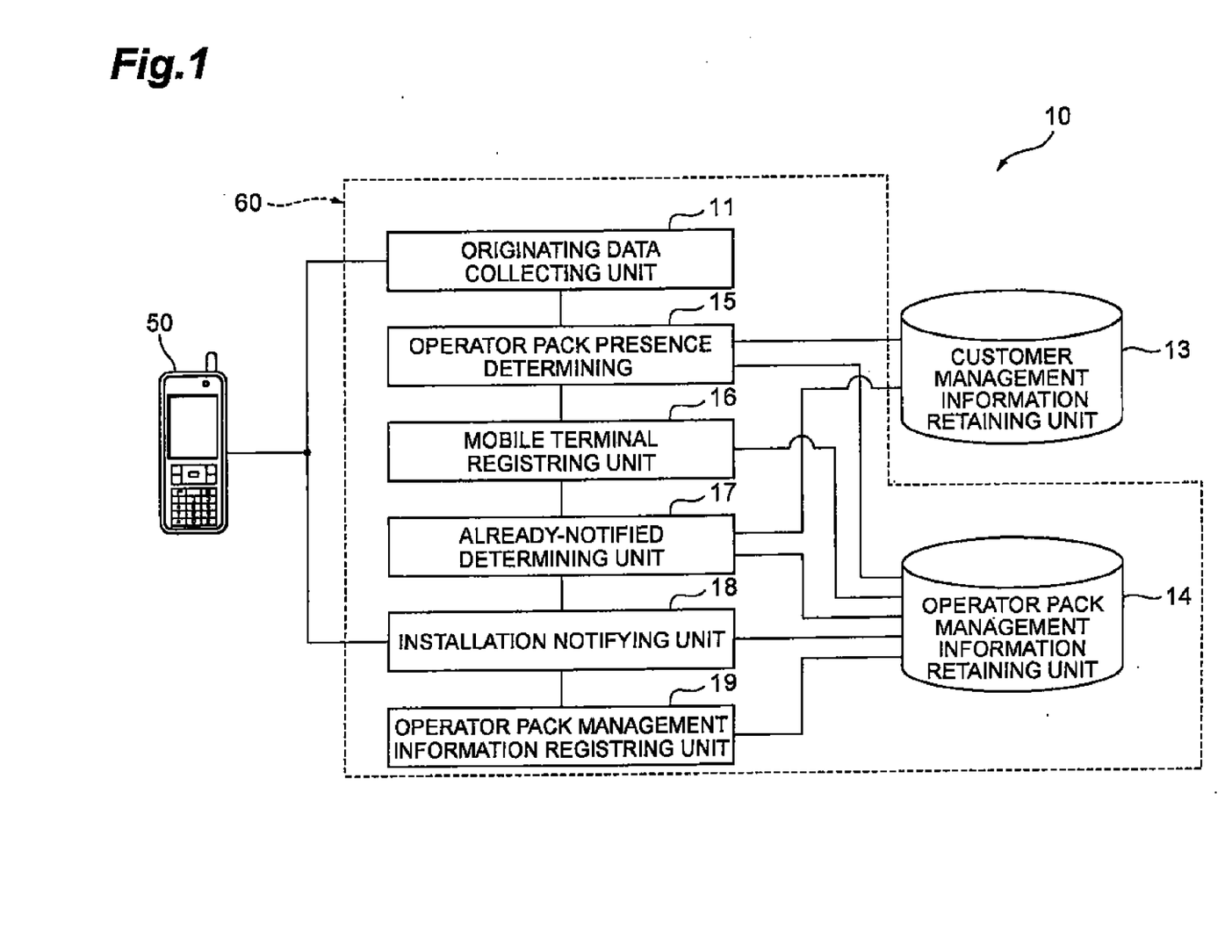
FIG. 1 is a functional configuration diagram of an installation notification system according to the present invention.

FIG. 1 shows a functional configuration diagram of a download system according to the present embodiment. As shown in FIG. 1, an installation notification system 10 in the present embodiment includes a customer management information retaining unit 13, a mobile terminal 50, and an installation notification server 60.

The customer management information retaining unit 13 retains a list of mobile phone serial numbers of all mobile terminals 50 which were sold with an operator pack being preliminarily installed thereon by a telecommunications carrier itself. A mobile phone serial number herein refers to an identifier that allows a mobile terminal 50 to be uniquely identified. In the present embodiment the customer management information retaining unit 13 is located in a server different from the installation notification server 60. However, it may be located in the installation notification server 60.

The mobile terminal 50 is a terminal that is connected through a network to the installation notification server 60, and is, specifically, a cell phone. However, it does not have to be limited to the cell phone, but may be a PDA (Personal Digital Assistant), PHS (Personal Handy-phone System), or the like.

The installation notification server 60 determines whether or not an appropriate operator pack is installed on the mobile terminal 50, and when it determines that the appropriate operator pack is not installed, it notifies the mobile terminal 50 that the operator pack is installable.

The installation notification server 60 includes an originating data collecting unit 11, an operator pack management information retaining unit 14 (operator pack management information retaining unit), an operator pack presence determining unit 15 (application presence determining unit), a mobile terminal registering unit 16, a already-notified determining unit 17, an installation notifying unit 18 (installation notifying unit), and an operator pack management information registering unit 19.

The originating data collecting unit 11 has a function to collect data sent from the mobile terminal 50 and a function to notify the operator pack presence determining unit 15 of the collected data.

The data collected by the originating data collecting unit 11 is the data sent from the mobile terminal 50 and refers, for example, to data included in headers of various packets, data sent upon establishment of sessions, and so on.

In the present embodiment, specific examples of the data collected by the originating data collecting unit 11 are Mobile phone serial number, Browser User-Agent, Email User-Agent, and SIP (PoC) User-Agent, which are sent from the mobile terminal 50. It is, however, noted that the data to be collected is by no means intended to be limited to these.

The Mobile phone serial number is an identifier that uniquely identifies the mobile terminal 50, and is sent by the mobile terminal 50 when the mobile terminal 50 requests location registration or when the mobile terminal 50 initiates voice communication. The Browser User-Agent is information about a type of a browser, and the mobile terminal 50 puts a Browser User-Agent value in an HTTP header and sends it when the mobile terminal 50 uses the browser. The Email User-Agent is information about a type of a mailer, and the mobile terminal 50 puts an Email User-Agent value in a mail header and sends it when the mobile terminal 50 sends an e-mail message by the mailer. The SIP (PoC) User-Agent is information about an application to provide the function of push-to-talk (Push to Talk).

These pieces of data do not have to be consciously sent by a user of the mobile terminal 50 and are sent even if the mobile terminal 50 is not equipped with an extra function such as an installer. For this reason, the installation notification system 10 is provided with the originating data collecting unit 11, whereby the server can obtain the information about applications present in the mobile terminal 50, without need for the user of the mobile terminal 50 to perform any extra operation and without need for the mobile terminal 50 to be equipped with an extra function.

The below will describe times when the originating data collecting unit 11 collects the data sent from the mobile terminal. As described above, the mobile terminal 50 sends its Mobile phone serial number on an occasion of initiating voice communication or on an occasion of requesting location registration. The Mobile phone serial number thus sent is temporarily retained in another server for executing the voice communication, which is not shown.

The originating data collecting unit 11 may be configured to perform a batch process to refer to the server at intervals of a fixed period of time (e.g., at intervals of one hour) and to extract the Mobile phone serial number. This configuration can lessen the load on facilities for executing the voice communication.

On the other hand, concerning the Email User-Agent value and Browser User-Agent value, the originating data collecting unit 11 preferably collects the value in real time when the mobile terminal 50 uses the mail function or uses the browser. In general, the load on the facilities for executing mail transmission and reception and browsing is lighter than that on the facilities for executing the voice communication, and therefore the load due to the real-time reception does not cause a significant issue.

Since the real-time collection permits the installation notification system 10 to check whether the operator pack is already installed and notify the mobile terminal 50 of installable information immediately after the mobile terminal 50 sends the Email User-Agent value or the Browser User-Agent value, it can provide an effect of permitting the user of mobile terminal 50 to check the installable information through HTTP during use of the browser or to check the installable information through e-mail during use of the mailer.

The operator pack management information retaining unit 14 retains identification data of applications incorporated in the operator pack, and management data of the mobile terminal 50. The applications incorporated in the operator pack are different among telecommunications carriers and their identification data include different contents for those different applications, so as to permit unique identification of each application.

Figure 2:
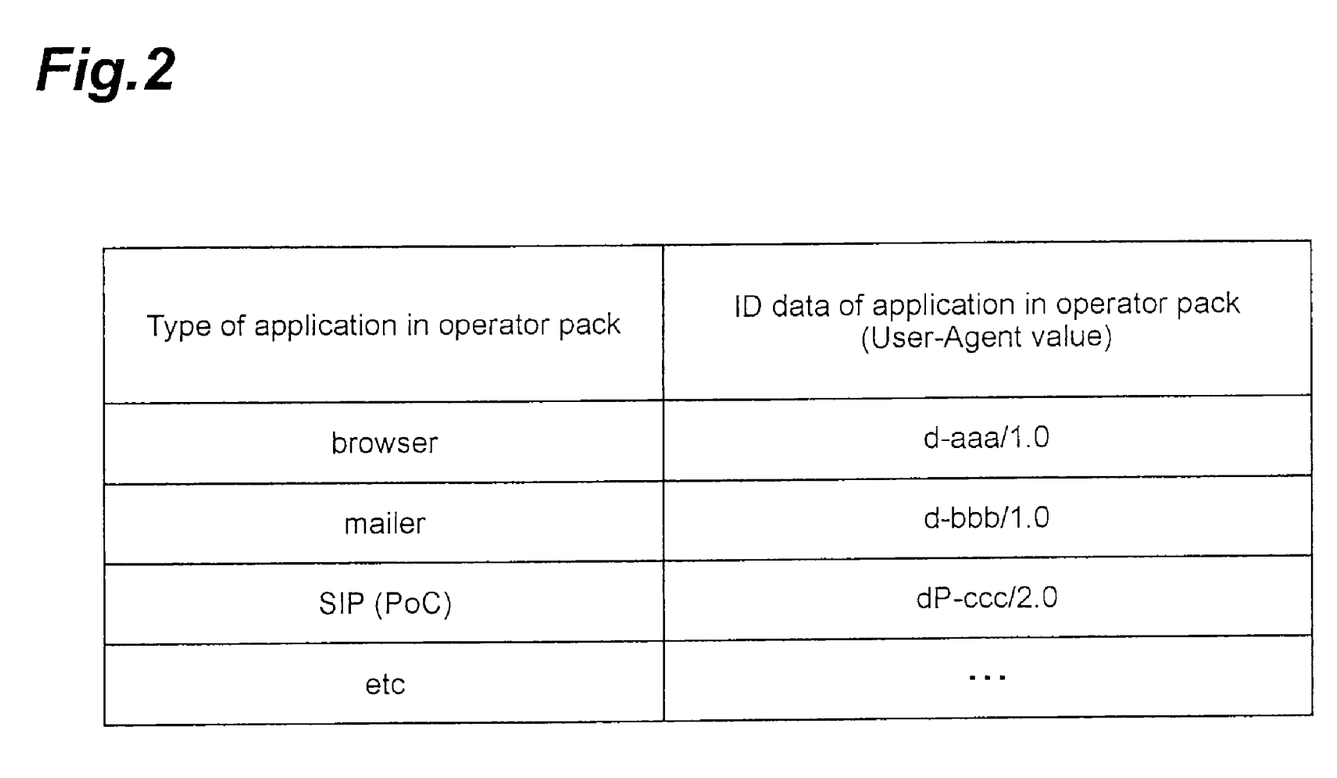
FIG. 2 is a drawing showing an example of application identification data retained in an operator pack management information retaining unit shown in FIG. 1.

FIG. 2 shows an example of the identification data of applications incorporated in the operator pack. As shown in FIG. 2, the operator pack management information retaining unit 14 retains the "identification data of application in the operator pack" in association with each "type of application in the operator pack." The "identification data of application in the operator pack" differs among telecommunications carriers as described above and FIG. 2 shows the example of the "identification data of application in the operator pack" to be installed as an operator pack provided by a telecommunications carrier of interest (i.e., the "optimum operator pack" in the present specification). In the example of FIG. 2, if the Browser User-Agent value being an identifier of the browser is "d-aaa/1.0," the browser can be determined to be the one incorporated in the optimum operator pack.

Figure 3:
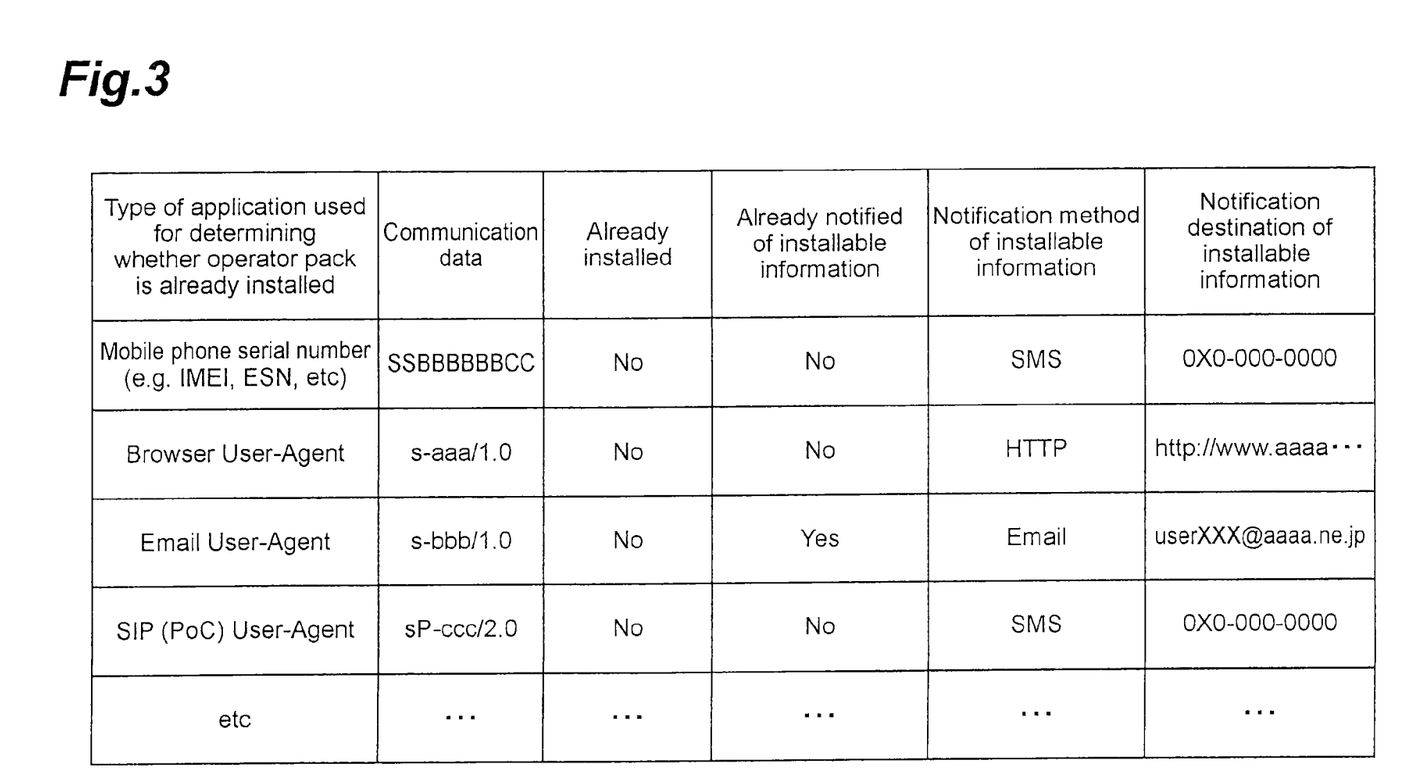
FIG. 3 is a drawing showing an example of management data of a mobile terminal retained in the operator pack management information retaining unit shown in FIG. 1.

FIG. 3 shows an example of the management data of the mobile terminal 50 retained in the operator pack management information retaining unit 14. The operator pack management information retaining unit 14 retains the table shown in FIG. 3, for each mobile terminal managed thereby. As shown in FIG. 3, the management data of the mobile terminal 50 includes columns of "type of application used for determining whether the operator pack is already installed," "communication data," "already installed," "already notified of installable information," "notification method of installable information," and "notification destination of installable information."

Types of data to be used for determining whether the operator pack is present in the mobile terminal 50 in the present embodiment are retained in the column of "type of application used for determining the operator pack is already installed." Data actually sent from the mobile terminal 50 is retained in the column of "communication data." In the column of "already installed," "No" is set as a default value and "Yes" is set when the below-described operator pack presence determining unit 15 determines that the operator pack is installed. In the column of "already notified of installable information," "No" is set as a default value and "Yes" is set when the below-detailed installation notifying unit 18 notifies the terminal of the installable information.

The "installable information" herein refers to information for notifying the user of the mobile terminal 50 that the optimum operator pack is installable.

Notification methods to be used when the installation notifying unit 18 notifies the terminal of the installable information are retained in the column of "notification method of installable information." Information about notification destinations of installable information by the installation notifying unit 18 is retained in the column of "notification destination of installable information."

In the present embodiment, as detailed below, the "notification method of installable information" is determined according to the "type of application used for determining whether the operator pack is already installed," and therefore, instead of the configuration wherein the "notification method of installable information" is included in the information retained by the operator pack management information retaining unit 14, a separate retaining unit may be provided for retaining the "notification method of installable information" in association with each "type of application used for determining whether the operator pack is already installed." This configuration can reduce the volume of data retained in the entire system.

The operator pack presence determining unit 15 has the following function: when the originating data collecting unit 11 collects the originating data, the operator pack presence determining unit 15 receives the collected originating data and compares the originating data with the data retained in the operator pack management information retaining unit 14, to determine whether the appropriate operator pack is installed on the mobile terminal 50.

The operator pack presence determining unit 15 has a function to notify the mobile terminal registering unit 16 of information on the result of the determination, the information about the mobile terminal 50, and the "type of application used for determining whether the operator pack is already installed."

The below will describe how the operator pack presence determining unit 15 in the present embodiment determines whether the appropriate operator pack is installed on the mobile terminal 50. In the present embodiment, it is determined whether the operator pack as software of a combination of various applications contributing to enabling the user of mobile terminal 50 to optimally utilize various services provided by the telecommunications carrier is installed. The applications in this case refer to the browser, mailer, and so on. Since the present embodiment involves collectively installing the operator pack as software of the combination of those applications, it can be determined that the operator pack is not installed yet on the mobile terminal 50, if it is found that one of the applications installed on the mobile terminal 50 is different from the applications in the operator pack. Which kinds of applications are installed on the mobile terminal 50 can be determined from the Mobile phone serial number, Browser User-Agent value, Email User-Agent value, and SIP (PoC) User-Agent value, as described above.

It will be specifically described using FIG. 2. The operator pack presence determining unit 15 compares the identification data of the application notified by the originating data collecting unit 11, with the corresponding "identification data of application in the operator pack" shown in FIG. 2. When the comparison results in finding that they are different, the operator pack presence determining unit 15 determines that the application installed on the mobile terminal 50 is not the application in the operator pack. Since the present embodiment adopts the installation of the operator pack, it can be determined that the operator pack is not installed yet on the mobile terminal 50.

For example, when the mobile terminal 50 uses the browser function, the operator pack presence determining unit 15 receives the Browser User-Agent value collected by the originating data collecting unit 11, at that point. When the received Browser User-Agent value collected by the originating data collecting unit 11 is not "d-aaa/1.0," the operator pack presence determining unit 15 determines that the browser loaded on the mobile terminal 50 is not the same as the browser in the operator pack. Since the present embodiment adopts the installation of the operator pack, it can be determined that the operator pack is not installed yet on the mobile terminal 50.

Similarly, when the Email User-Agent value collected by the originating data collecting unit 11 is not "d-bbb/1.0," the operator pack presence determining unit 15 can determine that the mailer loaded on the mobile terminal 50 is not the same as the mailer in the operator pack. In that case, the operator pack presence determining unit 15 determines that the operator pack is not installed yet on the mobile terminal 50.

Similarly, when the SIP (PoC) User-Agent value collected by the originating data collecting unit 11 is not "dP-ccc/2.0," the operator pack presence determining unit 15 can determine that it is not the same as the application in the operator pack and thus the operator pack presence determining unit 15 determines that the operator pack is not installed yet.

The following will describe the Mobile phone serial number. The Mobile phone serial number is stored in the other server not shown and is extracted in the batch process by the originating data collecting unit 11 at intervals of the fixed period of time. The operator pack presence determining unit 15 compares the Mobile phone serial number extracted in the batch process by the originating data collecting unit 11, with the Mobile phone serial number in the list of mobile terminals 50 sold with the operator pack being preliminarily installed, which is retained in the customer management information retaining unit 13. When they disagree, the operator pack presence determining unit 15 determines that the operator pack is not installed yet on the mobile terminal 50.

Since the installation notification system 10 has this function, it can determine the type of the application loaded on the mobile terminal 50, by making use of the data sent during communication by the mobile terminal 50. In the present embodiment since, the application is installed as the operator pack, it can be determined that the operator pack is not installed yet on the mobile terminal 50, when the application loaded on the mobile terminal 50 is different from the application in the operator pack.

Since the installation notification system 10 has the operator pack presence determining unit 15, it can determine that the operator pack is not installed on the mobile terminal 50, by the above-described method, without need for the mobile terminal 50 to be equipped with an extra function and without need for the user of the mobile terminal 50 to perform any active work.

The mobile terminal registering unit 16 has a function to register in the operator pack management information retaining unit 14, the mobile terminal 50 for which the operator pack presence determining unit 15 determined whether the appropriate operator pack was installed.

Specifically, it receives from the operator pack presence determining unit 15, the result of the determination on whether the operator pack is installed on the mobile terminal 50, the information about the mobile terminal 50, and the "type of application used for determining whether the operator pack is already installed," and when the operator pack management information retaining unit 14 does not retain the information about the mobile terminal 50, the mobile terminal registering unit 16 newly registers the mobile terminal 50 as a new terminal. In this case, "No" is set as a default value in both of the "already installed" and "already notified of installable information."

When the operator pack presence determining unit 15 determines that the operator pack is installed on the mobile terminal 50, the mobile terminal registering unit 16 sets "Yes" in all cells of "already installed" for the corresponding mobile terminal 50 retained in the operator pack management information retaining unit 14.

When the operator pack presence determining unit 15 determines that the operator pack is not installed on the mobile terminal 50, the mobile terminal registering unit 16 registers the mobile terminal 50 in the operator pack management information retaining unit 14 and thereafter notifies the already-notified determining unit 17 of the information about the mobile terminal 50 and the "type of application used for determining whether the operator pack is already installed."

The already-notified determining unit 17 has a function to determine whether the mobile terminal 50 was already notified of the installable information.

Specifically, based on the information about the mobile terminal 50 and the "type of application used for determining whether the operator pack is already installed" received from the mobile terminal registering unit 16, the already-notified determining unit 17 refers to the operator pack management information retaining unit 14 to make reference to the setting of "already notified of installable information" in association with the corresponding "type of application used for determining whether the operator pack is already installed" in the corresponding mobile terminal 50. When the setting is "No," it is determined that the mobile terminal was not notified yet of the installable information. When it is determined that the mobile terminal was not notified yet of the installable information, the already-notified determining unit 17 notifies the installation notifying unit 18 of the information about the mobile terminal 50 and the "type of application used for determining whether the operator pack is already installed."

Since the installation notification system 10 has the already-notified determining unit 17, it can determine whether the installable information was transmitted, application by application, and send the installable information only in the case where the installable information was not transmitted.

The installation notifying unit 18 has a function to notify the mobile terminal 50 of the installable information when the already-notified determining unit 17 determines that the mobile terminal 50 was not notified of the installable information.

Furthermore, the installation notifying unit 18 has a function to notify the operator pack management information registering unit 19 of the information about the mobile terminal 50 and the "type of application used for determining whether the operator pack is already installed."

The below will describe notification methods of the installable information in the present embodiment. In the present embodiment, whether the installable information is to be sent is determined based on the type of the application (mailer, browser, or the like) used for determining whether the operator pack is already installed, and a notification method thereof is also selected according to the type of the application used for determining whether the operator pack is already installed.

Namely, the notification method of the installable information is determined in accordance with which among the Mobile phone serial number, Browser User-Agent value, Email User-Agent value, and SIP (PoC) User-Agent value was used for the determination on the presence of the operator pack by the operator pack presence determining unit 15. This will be specifically described below.

As shown in FIG. 3, the operator pack management information retaining unit 14 retains the "notification method of installable information" as the management data of the mobile terminal 50 in association with each "type of application used for determining whether the operator pack is already installed." The installation notifying unit 18 detects the corresponding notification method of installable information from the information retained in the operator pack management information retaining unit 14, using the information about the mobile terminal 50 and the "type of application used for determining whether the operator pack is already installed" received from the already-notified determining unit 17.

When the operator pack presence determining unit 15 determines that the operator pack is absent in the mobile terminal 50, by the above-described method using the Mobile phone serial number, or determines that the operator pack is absent in the mobile terminal 50, using the SIP (PoC) User-Agent value, the installation notifying unit 18 notifies the mobile terminal 50 of the installable information by sending an SMS message to the phone number of the mobile terminal 50. The content of the notification preferably contains an installation method of the operator pack, for example, by describing a URL of a web site explaining the installation method, in addition to the information indicating that the operator pack is installable.

When the operator pack presence determining unit 15 determines that the operator pack is absent in the mobile terminal 50, by the above-described method using the Browser User-Agent value, the installation notifying unit 18 notifies the mobile terminal 50 of the installable information by displaying the installable information on the browser using HTTP. This is because it is confirmed in this case that the mobile terminal 50 is equipped with the browser function and it is highly likely that the mobile terminal 50 is still using the browser at the moment. The installable information is notified, for example, by displaying a pop-up menu using HTTP. The content of the display preferably contains an installation method of the operator pack, for example, by describing a link to a web site explaining the installation method, in addition to the information indicating that the operator pack is installable.

When the operator pack presence determining unit 15 determines that the operator pack is absent in the mobile terminal 50, by the above-described method using the Email User-Agent value, the installation notifying unit 18 notifies the mobile terminal 50 of the installable information by e-mail. This is because it is confirmed in this case that the mobile terminal 50 is equipped with the e-mail function and it is also confirmed that the user of the mobile terminal 50 actually uses the e-mail function of the mobile terminal 50. The content of the e-mail preferably contains an installation method of the operator pack, for example, by describing a URL of a web site explaining the installation method, in addition to the information indicating that the operator pack is installable. Since the e-mail address of the mobile terminal 50 can be detected from Email Client Header, the e-mail is sent to the mail address as a destination.

In general, a terminal such as a cell phone often operates normally using an application, and in the above configuration, the mobile terminal 50 is notified of the installable information through the e-mail when the user of the mobile terminal 50 manipulates the mailer or through the browser when the user manipulates the browser. For this reason, the user of the mobile terminal 50 can check the notification, without need for switching between applications. At the same time, the functions of the mobile terminal 50 can be utilized most appropriately. For example, when the mobile terminal 50 is equipped with the browser function, the installable information can be more effectively notified by the notification using HTML rather than SMS allowing character information only.

When the mobile terminal 50 is notified of the installable information, the operator pack management information registering unit 19 has functions to notify the operator pack management information retaining unit 14 of the information of the notification and to instruct it to retain the information.

Specifically, the operator pack management information registering unit 19 gives an instruction to set "Yes" as the corresponding value of "already notified of installable information" retained by the operator pack management information retaining unit 14, based on the information about the mobile terminal 50 and the "type of application used for determining whether the operator pack is already installed" received from the installation notifying unit 18.

Since the installation notification system 10 has the operator pack management information registering unit 19, when the mobile terminal 50 is notified of the installable information, the operator pack management information registering unit 19 sets "Yes" in the "already notified of installable information" set for each cell of "type of application used for determining whether the operator pack is already installed," to indicate the information that the mobile terminal was notified of the installable information, and the installation notifying unit 18 does not notify the mobile terminal 50 of the installable information when "Yes" is set in the "already notified of installable information"; therefore, when it is confirmed that the operator pack is absent, based on the same "type of application used for determining whether the operator pack is already installed," the system can prevent the installable information from repeatedly being sent.

Now, let us explain a relation among entries of "type of application used for determining whether the operator pack is already installed," in the transmission of the installable information. As described above, the installation notifying unit 18 sends the installable information for each entry of "type of application used for determining whether the operator pack is already installed." As shown in FIG. 3, the information of whether the operator pack installable information was already sent is also set for each entry of "type of application used for determining whether the operator pack is already installed." Specifically, let us first suppose the following situation: the mobile terminal 50 uses the mailer, the operator pack presence determining unit 15 determines that the operator pack is not installed on the mobile terminal 50, based on the Email User-Agent value, and then the installable information is sent by e-mail. In this case, "Yes" is set only to the value of "already notified of installable information" corresponding to "Email User-Agent" as the "type of application used for determining whether the operator pack is already installed." This state is shown in FIG. 3.

Thereafter, the mobile terminal 50 uses the browser and then the operator pack presence determining unit 15 determines that the operator pack is not installed on the mobile terminal 50, based on the Browser User-Agent value. In that case, the already-notified determining unit 17 determines whether the installable information was sent, with reference to the value of "already notified of installable information" corresponding to the "Browser User-Agent value" as the "type of application used for determining whether the operator pack is already installed." Therefore, the already-notified determining unit 17 determines that the installable information is not sent yet and the installation notifying unit 18 sends the installable information to the mobile terminal 50.

In this configuration, even if the mobile terminal 50 is notified once of the installable information by e-mail, the same mobile terminal 50 will be again notified of the installable information through the use of HTTP. This is particularly effective, for example, in such a case that the operator pack presence determining unit 15 happens to make a determination based on the Email User-Agent value even though the frequency of use of e-mail is low.

On the other hand, some users would be rather reluctant to receive the installable information two or more times. For this reason, the installable information preferably contains a method of checking whether the user wants to receive the installable information again. Specifically, in the case where the installable information is sent by SMS, an SMS message contains a notice, for example, "Please select this URL unless you want to receive this information in the future." When there is an access to the URL, a renotification information acquiring unit not shown receives information of the access. When the renotification information acquiring unit receives the information of the access, it sets "Yes" in all cells of "already notified of installable information" for the pertinent mobile terminal 50. When this configuration is adopted, the pertinent mobile terminal 50 will not be notified of the installable information thereafter.

Similarly, in the case where the installable information is sent by e-mail, the content of the e-mail contains a description of a content including a link to a URL, e.g., "Please quick here unless you want to receive this information in the future." When there is an access to the URL, the renotification information acquiring unit receives information of the access. When the renotification information acquiring unit receives the information of the access, it sets "Yes" in all cells of "already notified of installable information" for the pertinent mobile terminal 50.

In the case where the installable information is sent by HTTP, a display content in the browser is provided with a check box of "Reject future reception of this information." When this check box is checked, the renotification information acquiring unit receives information indicating that the check box is checked. When the renotification information acquiring unit receives information of the access, it sets "Yes" in all cells of "already notified of installable information" for the pertinent mobile terminal 50. This can prevent the users who are reluctant to receive the installable information multiple times, from receiving the installable information two or more times.

With reception of an instruction to execute installation of the operator pack in accordance with a determination by the user of the mobile terminal 50, the installation of the operator pack will be initiated.

Figure 4:
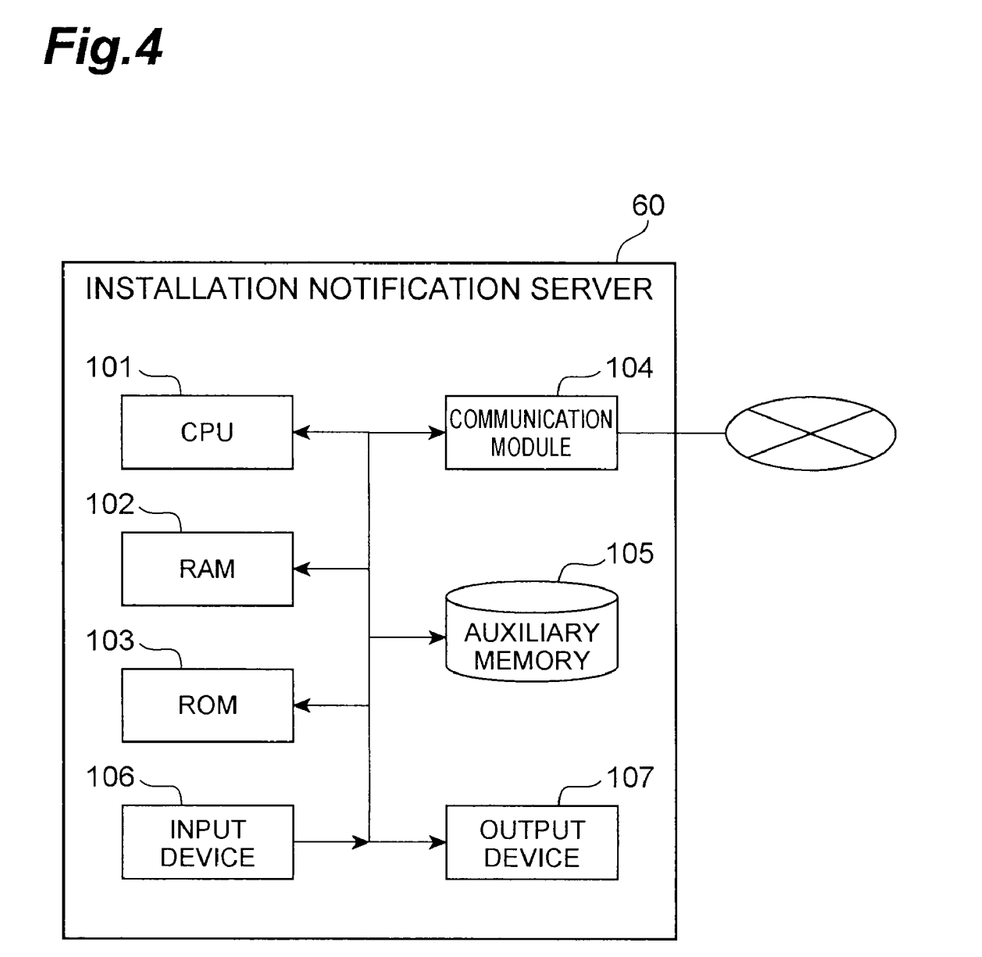
FIG. 4 is a hardware configuration diagram of an installation notification server shown in FIG. 1.

FIG. 4 shows a hardware configuration of the installation notification server 60. As shown in FIG. 4, the installation notification server 60 is physically equipped with CPU 101, RAM 102, ROM 103, communication module 104 to control communication, auxiliary memory unit 105 such as a flash memory or a hard disk, input device 106 such as a keyboard, and output device 107 such as an LCD or organic EL display. Each of the functions of the installation notification server 60 is implemented by retrieving predetermined software onto the hardware such as the CPU 101 or the RAM 102, letting the communication module 104, output device 107, and input device 106 operate under control of the CPU 101, and performing readout and writing of data from and into the RAM 102 and/or auxiliary memory unit 105. A hardware configuration of the mobile terminal 50 is also similar to the above.

Figure 5:
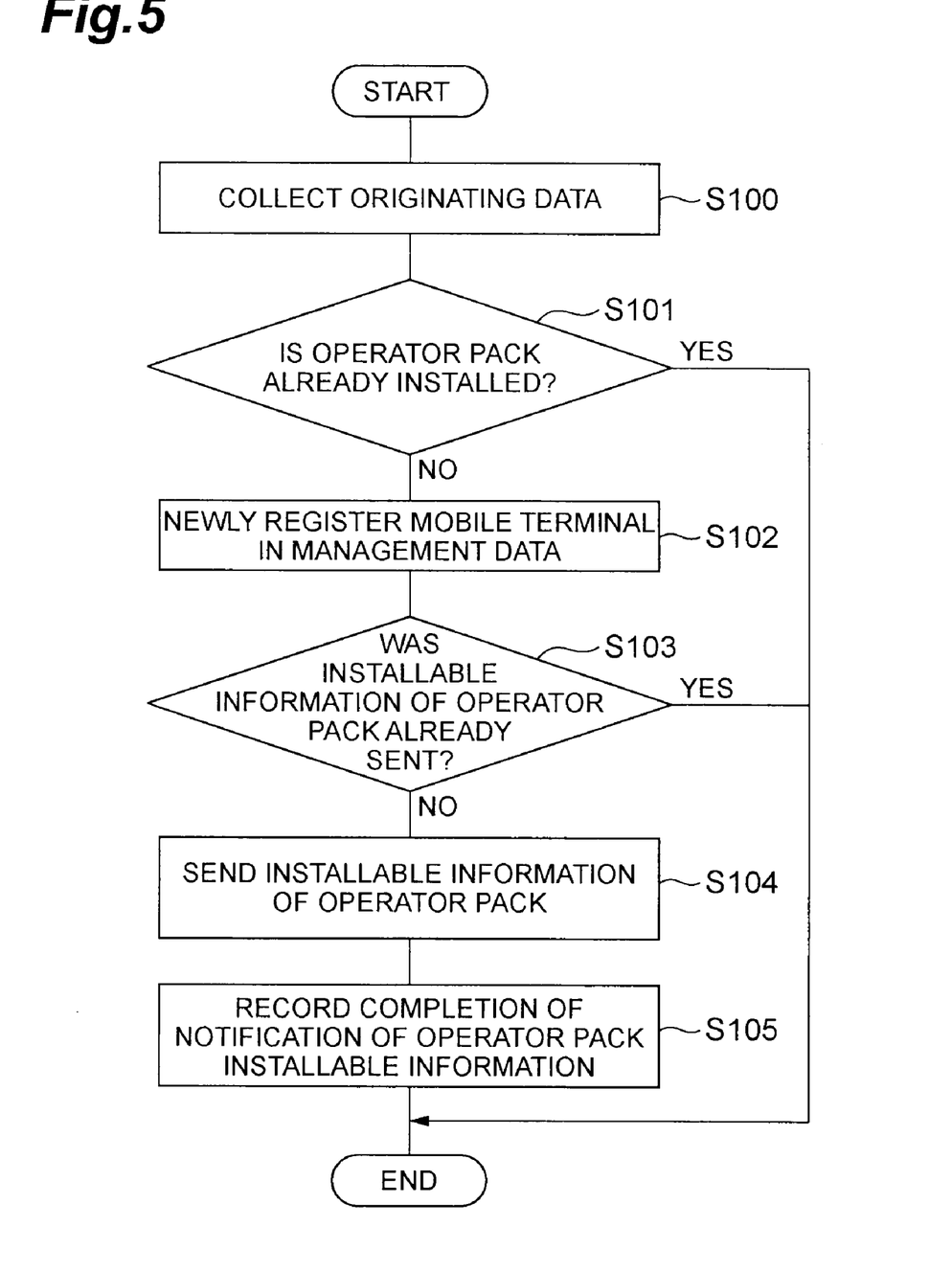
FIG. 5 is a drawing showing a flow of processing in the installation notification system.

A flow of processing of the installation notification system 10 in the present embodiment will be described below using FIG. 5.

The originating data collecting unit 11 collects the originating data sent from the mobile terminal 50 and notifies the operator pack presence determining unit 15 of the collected data (step S100). The operator pack presence determining unit 15 compares the received originating data with the data retained in the operator pack management information retaining unit 14, and thereby determines whether the appropriate operator pack is installed on the mobile terminal 50 (step S101: application presence determining step).

When the operator pack presence determining unit 15 determines that the appropriate operator pack is installed on the mobile terminal 50 ("Yes" in step S101), the processing is terminated. When the operator pack presence determining unit 15 determines that the appropriate operator pack is not installed on the mobile terminal 50 ("No" in step S101), the mobile terminal registering unit 16 registers the information of the mobile terminal 50 in the operator pack management information retaining unit 14 (step S102).

The already-notified determining unit 17 determines whether the mobile terminal 50 was already notified of the installable information (step S103: already-notified determining step). When the already-notified determining unit 17 determines that the mobile terminal 50 was already notified of the installable information ("Yes" in step S103), the processing is terminated.

When the already-notified determining unit 17 determines that the mobile terminal 50 was not notified of the installable information ("No" in step S103), the installation notifying unit 18 notifies the mobile terminal 50 of the information indicating that the operator pack is installable (step S104: installation notifying step). The operator pack management information registering unit 19 sends the information that the mobile terminal 50 was notified of the installable information, to the operator pack management information retaining unit 14. The operator pack management information retaining unit 14 retains the information that the mobile terminal 50 was notified of the installable information, which was received from the operator pack management information registering unit 19 (step S105: management information registering step).

The action and effect of the installation notification server 60 of the present embodiment described above will be described below. In the installation notification server 60 of the present invention, the operator pack presence determining unit 15 determines whether an application in the operator pack is present in the mobile terminal 50, based on the originating data sent from the mobile terminal 50, and when the operator pack presence determining unit 15 determines that the application is absent, the installation notifying unit 18 notifies the mobile terminal 50 of the installable information indicating that the operator pack including the application is installable; therefore, without need for the mobile terminal 50 to be equipped with an extra function and without need for the user of the mobile terminal 50 to perform any extra work, the server can recognize that the operator pack is absent in the mobile terminal 50 and notify the mobile terminal 50 of information that the operator pack is installable.

Furthermore, the operator pack presence determining unit 15 determines a type of an application present in the mobile terminal 50, based on the originating data, and determines that a particular application is present when the type of the application determined is the same as the type of the application in the operator pack, whereby the presence of the particular application can be determined easier.

When the installation notifying unit 18 notifies the mobile terminal 50 of the installable information, the operator pack management information registering unit 19 retains the information of the notification in the operator pack management information retaining unit 14; the already-notified determining unit 17 determines whether the mobile terminal was already notified of the installable information, based on the information retained in the operator pack management information retaining unit 14; when the already-notified determining unit 17 determines that the mobile terminal was already notified of the installable information, the installation notifying unit 18 does not notify the mobile terminal of the installable information, whereby the same notification can be prevented from being sent two or more times.

Second Embodiment

The foregoing embodiment involved the installation of the operator pack as software of the combination of various applications contributing to enabling the user of the mobile terminal to optimally utilize various services provided by the telecommunications carrier. However, the installation onto the mobile terminal 50 may be performed on an application-by-application basis. The second embodiment will describe an application-by-application installation method. However, the second embodiment will be described below with focus on different portions, while omitting the description of the same portions as in the first embodiment.

In the present embodiment, the operator pack presence determining unit 15 determines whether an application is already installed, the already-notified determining unit 17 determines whether the mobile terminal was already notified of installable information, for each installation determined, and when it is determined that the installable information was not sent, the installable information is sent as information indicating that the application, the installable information of which is determined as not sent, is installable.

Figure 6:
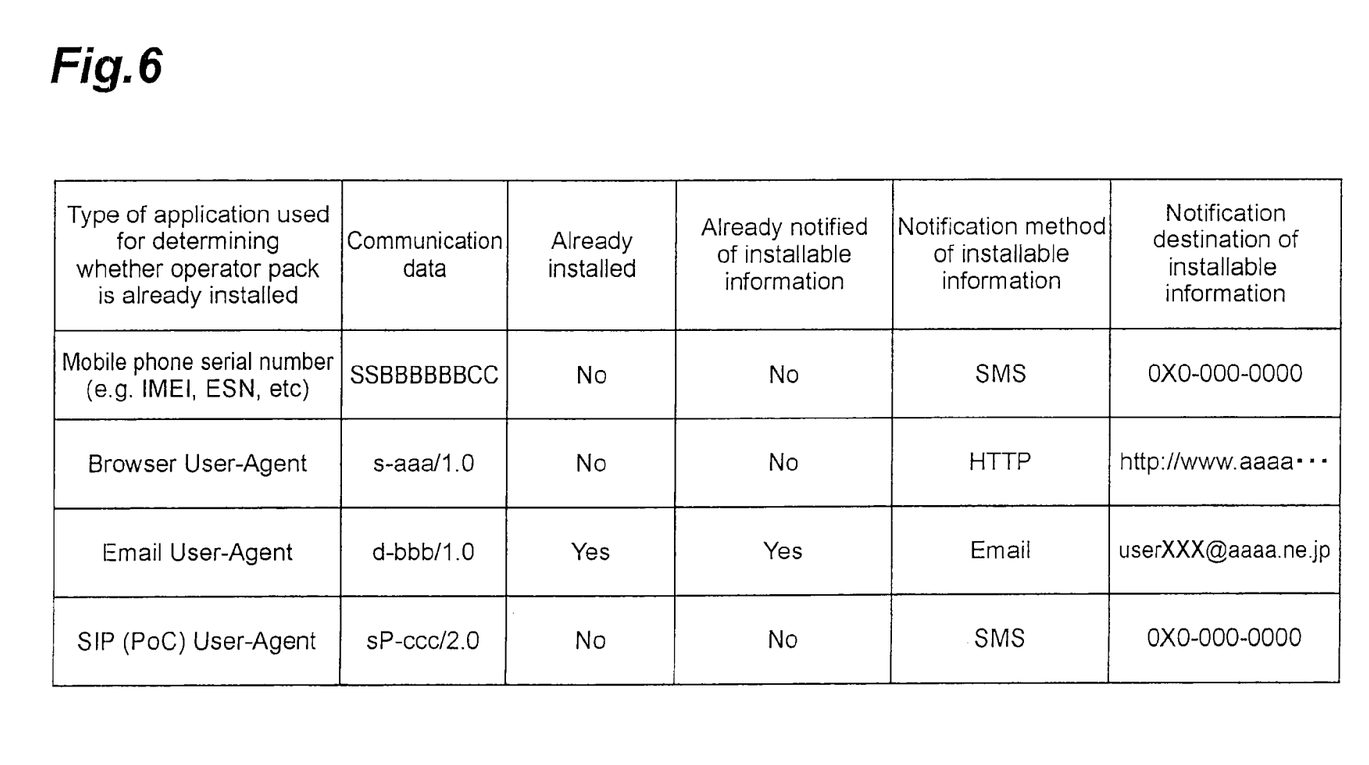
FIG. 6 is a drawing showing an example of management data of a mobile terminal in the second embodiment.

In the present embodiment, the management data of the mobile terminal 50 retained by the operator pack management information retaining unit 14 is as shown in FIG. 6. In the example shown in FIG. 6, the mailer in the operator pack is installed on the mobile terminal 50 ("Yes" is set in "already installed") but the other applications are not installed yet. When in this state the operator pack presence determining unit 15 determines the presence or absence of installation based on the Email User-Agent value by the same method as in the aforementioned first embodiment, it determines that the application is already installed on the mobile terminal 50. On the other hand, when the operator pack presence determining unit 15 determines the presence or absence of installation based on the Browser User-Agent value, the operator pack presence determining unit 15 determines that the browser is not installed yet on the mobile terminal 50. In this case, the already-notified determining unit 17 then determines whether the mobile terminal was already notified of the installable information of the browser. How to determine it is the same as the method described in the first embodiment. In the example shown in FIG. 6, "No" is set in "already notified of installable information" corresponding to the "Browser User-Agent" as the "type of application used for determining whether the operator pack is already installed," and it is therefore determined that the mobile terminal was not notified yet of the installable information of the browser. For this reason, the installation notifying unit 18 displays the installable information on the browser of the mobile terminal 50, using HTTP.

In the present embodiment, when an instruction to execute installation is given in accordance with a determination by the user of the mobile terminal 50, installation of an application (the browser in the specific example for explanation) is initiated instead of the installation of the operator pack.

The below will describe the action and effect of the installation notification server 60 of the present embodiment described above. In the installation notification server 60 of the present invention, the operator pack presence determining unit 15 determines whether an application in the operator pack is present in the mobile terminal 50, based on the originating data sent from the mobile terminal 50; when the operator pack presence determining unit 15 determines that the application is absent, the installation notifying unit 18 notifies the mobile terminal 50 of the installable information indicating that the application is installable; therefore, without need for the mobile terminal 50 to be equipped with an extra function and without need for the user of the mobile terminal 50 to perform any extra work, the server can recognize that the application is absent in the mobile terminal 50 and notify the mobile terminal 50 of the information that the application is installable. Furthermore, the installable information is sent on an application-by-application basis, which can prevent the installable information as to an application not used, from being transmitted.

Modification Example

The first embodiment described the example of installation of the operator pack and the second embodiment described the example of application-by-application installation. These can be applied in combination. Namely, the user of the mobile terminal 50 may be allowed to select either installation of the operator pack or installation of each application.

In this case, an option button to select installation of the operator pack or installation of each application is displayed on the installable information or at the URL describing the installation method. When the user of the mobile terminal 50 selects installation of the operator pack, the installation of the operator pack is initiated; when the user selects installation of each application, the installation of the single application is initiated.

Figure 7:
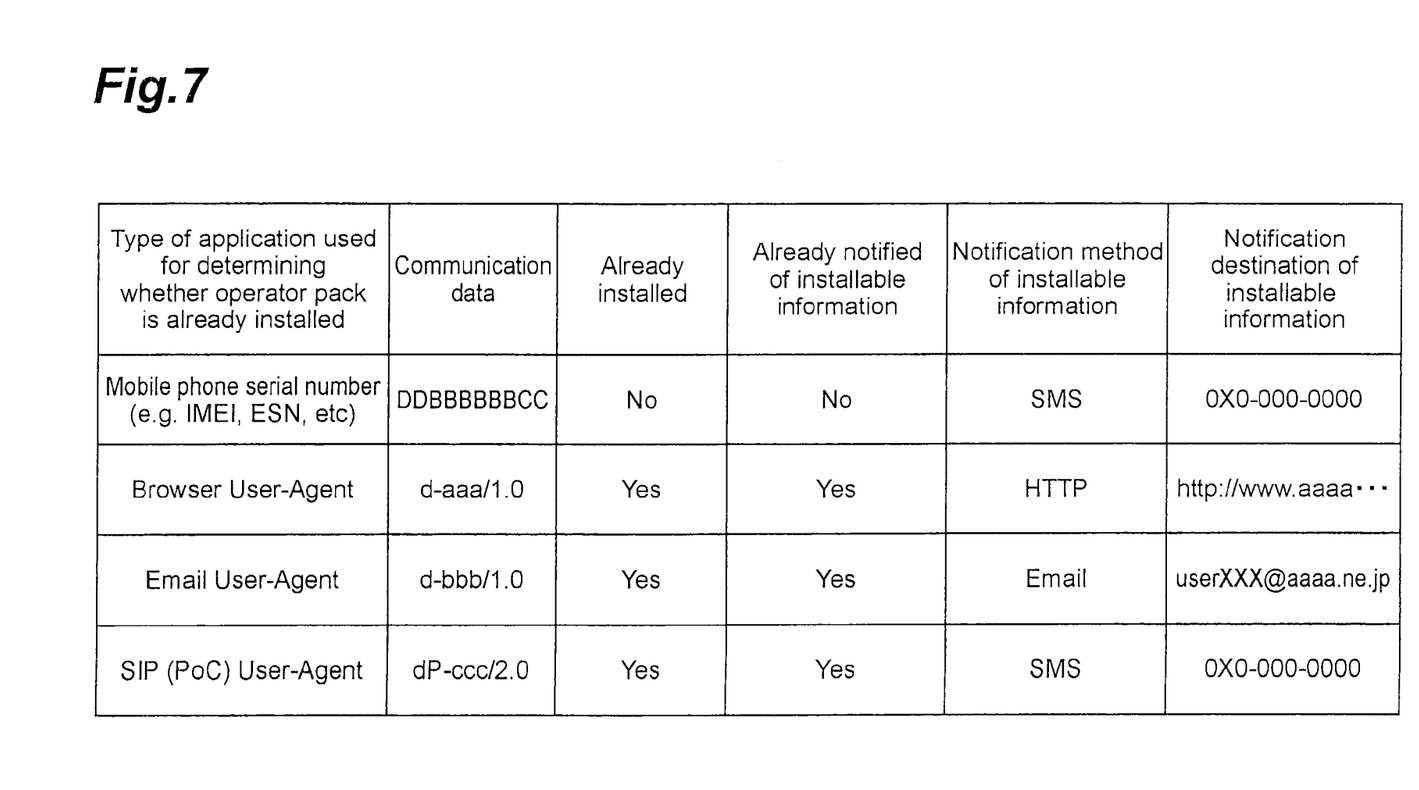
FIG. 7 is a drawing showing an example of management data of a mobile terminal in the third embodiment.
Figure 8:
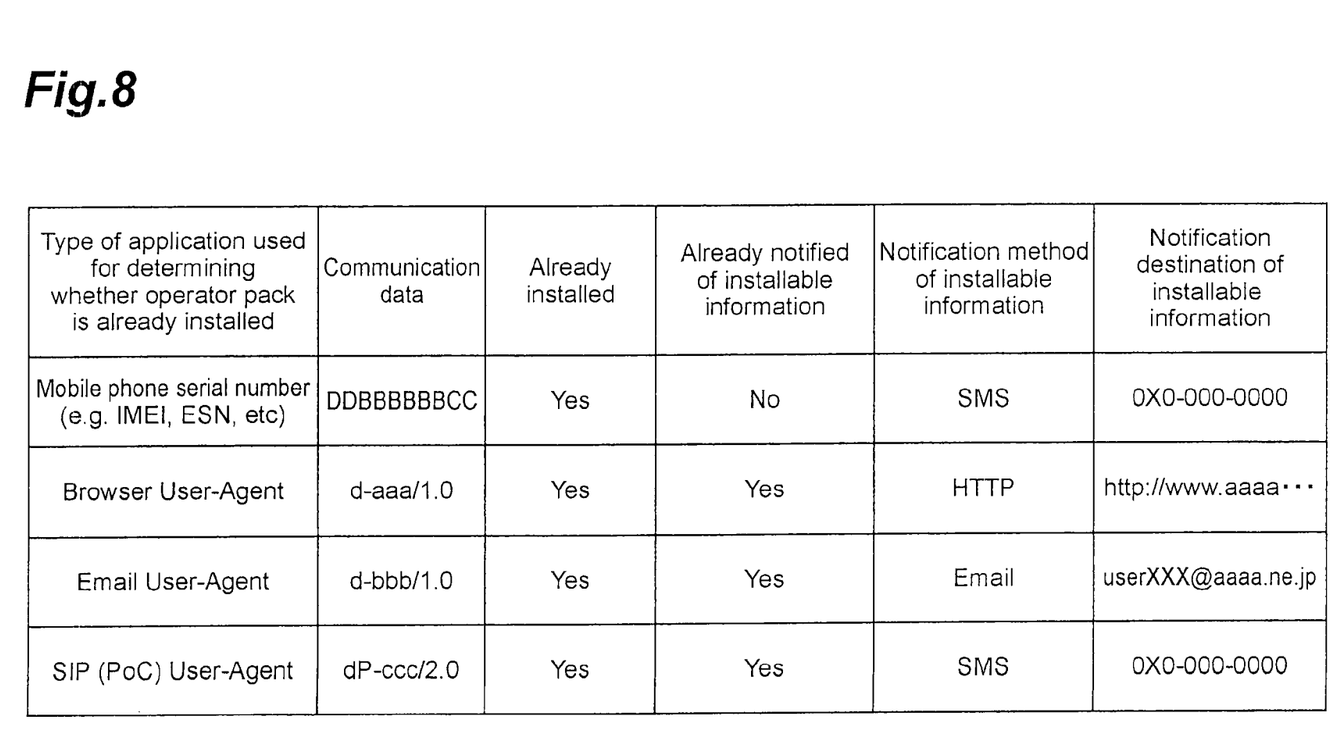
FIG. 8 is a drawing showing an example of management data of a mobile terminal in the third embodiment.

The management data of the mobile terminal 50 retained in the operator pack management information retaining unit 14 in the present modification example will be described using FIGS. 7 and 8. In the example of FIG. 7, "Yes" is set in all cells of "already installed" except for "Mobile phone serial number" as the "type of the application used for determining whether the operator pack is already installed." In this case, it is assumed that the operator pack is installed and "Yes" is also set in the cell of "already installed" corresponding to "Mobile phone serial number" as shown in FIG. 8. This permits the server to determine that the applications are already installed as the operator pack.

What is claimed is:
1. An installation notification method comprising:
an application presence determining step of, based on originating data sent from a terminal, determining whether a particular application in an operator pack is present in the terminal, the particular application being associated with a particular service of a telecommunication carrier, and the originating data corresponding to the particular application and being sent by the terminal;
an installation notifying step of, when it is determined in the application presence determining step that the particular application is absent, notifying the terminal of installable information indicating that the particular application is installable;
a management information registering step of retaining information of notification in operator pack management information retaining unit when the installation notifying step results in notifying the terminal of the installable information; and an already-notified determining step of determining whether the terminal was already notified of the installable information, based on information retained in the operator pack management information retaining unit, wherein the installation notifying step includes not notifying the terminal of the installable information when it is determined in the already-notified determining step that the terminal was already notified of the installable information.

2. The installation notification method according to claim 1, wherein the installation notifying step includes notifying the terminal of installable information indicating that the operator pack is installable, when it is determined in the application presence determining step that the particular application is absent.

3. The installation notification method according to claim 1, wherein the application presence determining step includes determining a type of an application present in the terminal, based on the originating data, and determining that the particular application is present, when the type of the application determined is the same as a type of the application in the operator pack.

4. The installation notification method according to claim 1, wherein the operator pack includes a plurality of applications that are each associated with a different service of the telecommunication carrier, and the originating data is different for each of the plurality of applications.

5. An installation notification method comprising:

an application presence determining step of, based on originating data sent from a terminal, determining whether a particular application in an operator pack is present in the terminal;

an installation notifying step of, when it is determined in the application presence determining step that the particular application is absent, notifying the terminal of installable information indicating that the particular application is installable;

a management information registering step of retaining information of notification in operator pack management information retaining unit when the installation notifying step results in notifying the terminal of the installable information; and an already-notified determining step of determining whether the terminal was already notified of the installable information, based on information retained in the operator pack management information retaining unit, wherein the installation notifying step includes not notifying the terminal of the installable information when it is determined in the already-notified determining step that the terminal was already notified of the installable information.

* * * * *